Jan. 16, 1951     A. S. ORLANDI     2,538,264
GAUGING ELEMENT
Filed Jan. 18, 1947
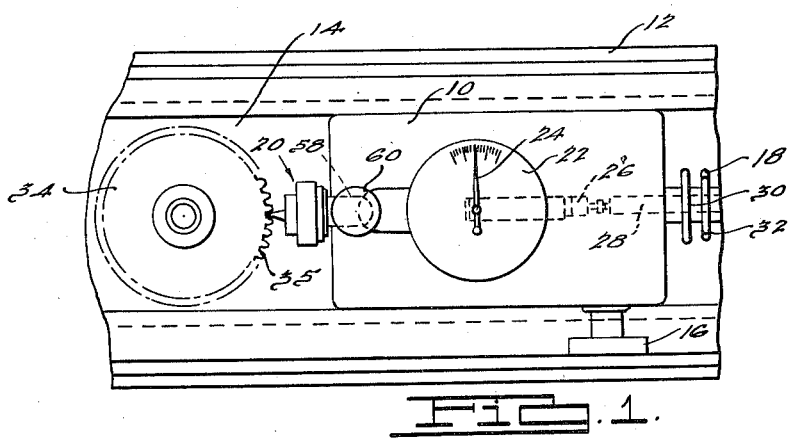
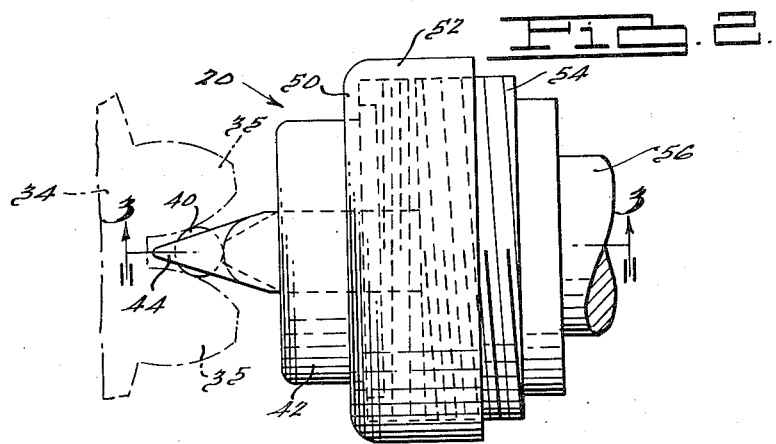
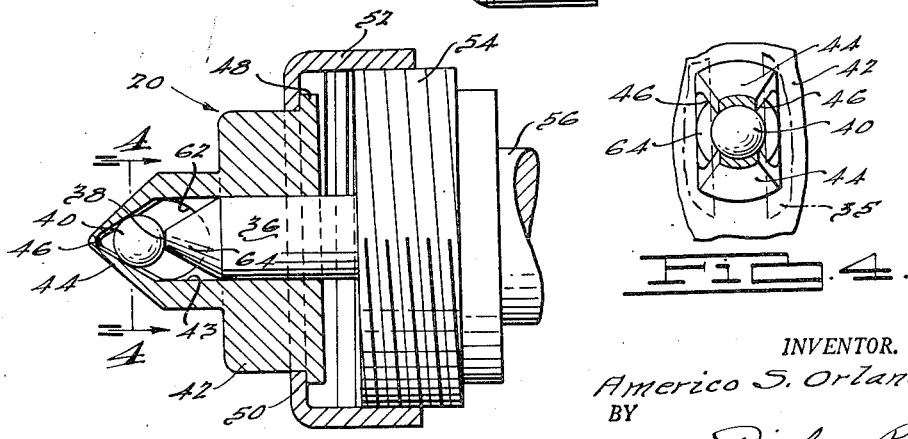
INVENTOR.
Americo S. Orlandi
BY
Harness, Dickey & Pierce
ATTORNEYS.

Patented Jan. 16, 1951

2,538,264

UNITED STATES PATENT OFFICE 2,538,264

GAUGING ELEMENT

Americo S. Orlandi, Detroit, Mich.

Application January 18, 1947, Serial No. 722,912

5 Claims. (Cl. 33—179.5)

1

This invention relates broadly to new and useful improvements in gear-checking apparatus.

In my copending application, Serial No. 663,147, which was filed April 18, 1946, I disclose a machine for accurately testing gears and the like for characteristics such as parallelism, backlash, concentricity, and pitch diameter. According to the invention there shown, checking elements in the form of elongated rolls are inserted lengthwise between adjacent teeth and at opposite sides of a gear to be tested, and variations from a predetermined standard in the spacing or positions of the rolls is registered on suitably mounted dials. While this arrangement is generally satisfactory, some trouble is encountered in the case of worm gears or helical gears, since under these conditions it is difficult to fit the rolls properly between the teeth of the work. The present invention is concerned primarily with means for adapting the machine for testing work such as worm gears and helical gears, which cannot be tested by the prior apparatus, and, while it can be used on other types of work, such as spur gears and the like, this usually will not be done, since the rolls are satisfactory and more accurate for this purpose.

An important object of the present invention is to provide a gear-checking device which can be adapted to a machine of the above-mentioned character and which employs a spherical checking element instead of the rolls heretofore used.

Another object of the invention is to provide a gear-checking device which can be adapted with equal facility to any of the usual types or sizes of gears or the like.

Still another object of the invention is to provide a gear-checking device having novel means for holding and locating the checking element.

Yet another object of the invention is to provide a gear-checking device wherein the checking element is removable so that elements of varying size can be used.

A further object of the invention is to provide a gear-checking device wherein the means for holding the checking element is uniquely constructed and arranged to assure identical positioning of the different-sized elements.

A still further object of the invention is to provide a gear-checking device wherein the retaining member is uniquely associated with the gear-checking element so as not to engage any part of the gear or otherwise interfere when the gear is tested.

Other objects and advantages of the invention will be apparent during the course of the following description.

2

In the drawing forming a part of this specification and wherein like numerals are employed to designate like parts throughout the same, Fig. 1 is a fragmentary, top plan view of a gear-checking machine of the type shown in my copending application hereinabove referred to and showing a spherical checking element and a mounting therefor embodying the present invention associated therewith;

Fig. 2 is a fragmentary, enlarged plan view of the checking element and mounting and illustrating the manner in which the same coacts with a gear during testing of the latter;

Fig. 3 is a longitudinal sectional view taken on the line 3—3 of Fig. 2; and

Fig. 4 is a transverse, vertical sectional view taken on the line 4—4 of Fig. 3.

Except for the ball-shaped checking element and its mounting, the gear-checking machine here shown is identical to the one disclosed in my copending application hereinabove referred to; however, if desired, the checking element and mounting may be used on other types of gear-checking apparatus. Since the particular gear-checking machine here disclosed is shown merely by way of example and to illustrate the present invention in an operative setting, a detailed description of the general machine need not be given. In so far as the present invention is concerned, it is merely necessary that the general machine structure include means for mounting a gear or the like to be tested and that it have some provision for holding the checking element and its mounting in operative association with the gear.

In order that a clear understanding may be had of the instant invention, a general description of the construction and operation of the gear-checking machine is first given. In the machine here shown, a slide 10 is mounted for longitudinal sliding movement on a base 12 at one side of a gear-testing station 14. Suitable mechanism, including a hand wheel 16, is provided for moving the slide 10 back and forth relative to the station 14, and means including a lock nut 18 is provided for holding the slide fixed in a selected adjusted position on the base. A checking device 20 is carried by the slide 10 and extends from the inner end thereof toward the gear-testing station 14. A dial 22 having an indicating pointer 24 is mounted on the slide 10, and this dial coacts with the checking device 20 to register faults or inaccuracies in the gear being tested. As clearly shown in the drawing, the dial 22 includes the usual follower mechanism 26, and the slide 10 is equipped with an adjusting screw 28 which coacts with the follower to set or adjust the pointer 24. A thumb nut 30 and lock nut 32 on adjusting screw 28 hold the latter in a selected adjusted position.

In operation, the checking device 20 is positioned by gage or "Jo" blocks to accommodate a properly formed gear, and slide 10 is then retracted to clear the gear station 14. A gear 34 to be tested is mounted in station 14 with its axis arranged vertically to the base 12 so that the teeth 35 are disposed in confronting relation to checking device 20. The slide 10 is then returned to its initial position on the base 12 so that the checking element enters between and presses against adjacent teeth 35. Any differences between the gear being tested and the theoretical, proper gear are registered on the dial 22.

The gear-checking machine is here shown with only one slide 10, but it is to be understood that two slides may be provided as shown in my copending application hereinabove referred to. The two slides are disposed at opposite sides of the gear station 14 and may carry identical gear-checking devices 20. The machine is operated in the conventional manner or as described in my copending application to test the pitch diameter of the gear 34 or to check the backlash or concentricity characteristics thereof. In these operations one or both gear-checking elements can be used as required.

According to the present invention a generally bar-shaped, horizontally arranged anvil 36 projects horizontally from the inner face of slide 10, and this anvil is formed with a terminal seat or flat anvil face 38 for receiving a spherical checking element 40. A retainer 42 has a longitudinal bore 43 which receives and snugly but slidably fits the anvil 36, and at the forward end of the retainer is a forwardly tapered vertical strap 44 which extends over or embraces the element 40. At each side of the strap 44 are openings 46, and the side portions of checking element 40 extend through these openings for engagement with the gear teeth 35, as shown in Fig. 2. At its rearward end, the retainer 42 is formed with a radial flange 48 which seats forwardly against the inturned flange portion 50 of an internally threaded collar 52, and the latter screws onto a relatively large disk-shaped body 54 which is formed integrally with the anvil 36.

The checking device preferably is removably associated with the slide 10. According to the present invention, the body 54 is formed with a rearwardly extending shank 56 which fits into a bore or socket 58 in the inner, vertical face of the slide and is removably fastened therein by a thumb-screw 60 (Fig. 1) or the like.

As suggested, the machine is operated in the conventional manner to check various physical characteristics of the gear 34, and the mounting for checking element 40 is such that the latter is readily removable from retainer 42. Thus, a series of checking elements of graduated size can be used and the particular checking element selected according to the size of the gear to be tested in the conventional manner.

It will be observed that retainer 42 and collar 52 are readily removable so that the anvil 36 can be accurately positioned in the conventional manner by means of gage or "Jo" blocks (not shown). Moreover, the gaging element 40 can be inserted into the retainer 42 either when the latter is removed from anvil 36 or when it is merely loosened and moved forwardly a slight distance on the anvil. When the latter procedure is adopted, the checking element 40 is inserted through one of the side openings 46, and in this connection it will be observed that the rear portions of openings 46 extend the full width of the bore 43 and that they have curved rearward edges 62 which are shaped to accommodate the largest ball or checking element to be used in the assembly. In order further to facilitate insertion or removal of the checking element 40, the nose or terminal portion of anvil 36 is made generally conical in shape, as best shown in Fig. 3.

To assure accurate operation of the machine it is necessary that all the checking elements 40 be identically centered or positioned in the assembly regardless of size, and it is highly desirable that they be disposed in coaxial relationship with the anvil 36. According to the present invention, identical positioning of the checking element is accomplished automatically by the forwardly tapered portions of strap 44. In this connection it will be observed that these portions are arranged at the same taper angle and that they converge toward a point on the extended axis of anvil 36. Also, in order better to retain the element 40, the inner surfaces of the strap portions are cupped or curved transversely so that they define opposite surfaces of a conical figure.

The unique shape of the retainer 42 has the further advantage that it can be held to exceedingly accurate dimensions by simple and inexpensive machining operations. For example, it is contemplated that the strap 44 initially be formed on the rear portion of the retainer 42 merely as a cylindrical projection having a tapered terminal portion. The bore 43 and the cone-shaped end of the bore which defines the inner surfaces of strap 44 are then machined either in the same or as successive operations. In either event, the cone-shaped end portion of the bore 43 can be located exactly concentrically to the bore and, consequently, to the anvil 36. Diametrically opposite sides of the projection are then machined to provide the tapered appearance shown in Fig. 2. This latter operation automatically forms the two side openings 62 and defines the finished strap 44.

From the foregoing it will be readily apparent that, when the retainer 42 is tightened against checking element 40, the curved inner surfaces of strap 44 engage and automatically position the checking element and hold the same solidly and centrally against seat 38. Also, when checking element 40 is held or confined in this manner, the opposite side portions thereof project equally through openings 46 and are exposed for engagement with adjacent teeth 35, as shown in Fig. 2. In this connection it will be observed (Fig. 2) that the strap 44 also is tapered forwardly in plan as well as in side elevation so that it can accommodate a checking element 40 of any suitable size and at the same time fit between adjacent teeth 35 without engaging any portion of the gear or interfering in any way with the gaging operation.

It will be readily appreciated by those skilled in the art that the checking element 40 must be exceeding accurate in size and exactly spherical in shape if precise measurements are to be obtained. One advantage of the instant construction and arrangement is that balls or spheres can be made exceedingly accurately and relatively inexpensively by conventional equipment. Thus, although the checking assembly is simply constructed and inexpensively made, it is capable of testing gears and the like with great accuracy.

Having thus described the invention I claim:

1. In a gear-checking machine, relatively movable, concentric supporting and retaining members, said supporting member having a ball seat and said retaining member having a forwardly tapered strap portion forwardly of said seat; a ball confined between said seat and said strap portion, the inner face of said strap portion being shaped to define opposite surfaces of a cone disposed concentrically to said seat and said ball extending laterally of the former for engagement with two opposite surfaces to be tested; and means for tightening said retaining member against said ball.

2. A gear-checking device comprising a cylindrical supporting member having a ball seat at one end thereof; a ball on said seat; a ball retainer slidably mounted on, concentric to, and snugly fitting said supporting member, said retainer having strap portions arranged in converging relation and embracing said ball and said ball extending laterally of the straps for engagement with two opposed surfaces to be tested, said strap portions being arranged at the same taper angle and converging toward a point on the extended axis of said supporting member, the inner surfaces of said strap portions being curved transversely so as to define opposite surfaces of a conical figure; and means for tightening said strap portions against said ball to force the latter solidly against said seat.

3. A gear-checking device comprising a cylindrical supporting member having a ball seat at one end thereof; a ball on said seat; a ball retainer slidably mounted on and snugly fitting said supporting member, said retainer having strap portions formed with conical inturned surfaces arranged in converging relation and embracing said ball and said ball extending laterally of the straps for engagement with two opposed surfaces to be tested; and means for retracting the retainer on said supporting member whereby to tighten said strap portions against said ball to center the latter precisely on said seat.

4. A gear-checking device comprising relatively movable, concentric supporting and retaining members, said supporting member having a ball seat at one end thereof; a ball on said seat; and a slidably mounted ball retaining member having tapered strap portions arranged in converging relation and embracing said ball, said ball extending laterally of the straps for engagement with two opposed surfaces to be tested; means for guiding said retaining member during sliding movement thereof to maintain the tapered straps converging toward a point on the extended axis of said supporting member; and means for actuating said retaining member to tighten the strap portions against said ball whereby to force the ball solidly against and to center the same on said seat.

5. A gear-checking device comprising a cylindrical supporting member having a ball seat at one end thereof; and a ball retainer slidably mounted on and snugly fitting said supporting member, said retainer having strap portions disposed forwardly of said seat and converging toward a point on the extended axis of said support; and actuator means coactive with said retainer for positively retracting the latter on said support.

AMERICO S. ORLANDI.

REFERENCES CITED

The following references are of record in the file of this patent:

UNITED STATES PATENTS

| Number | Name | Date |
| --- | --- | --- |
| 1,157,389 | Hess | Oct. 19, 1915 |
| 1,170,255 | Hess | Feb. 1, 1916 |
| 1,225,315 | Conrad | May 8, 1917 |
| 1,628,733 | Morris | May 17, 1927 |
| 1,937,667 | Parsley | Dec. 5, 1933 |
| 2,306,469 | Rupley | Dec. 29, 1942 |